(12) United States Patent
Datena et al.

(10) Patent No.: US 7,389,280 B2
(45) Date of Patent: Jun. 17, 2008

(54) COMPUTER-BASED INTELLIGENCE METHOD AND APPARATUS FOR ASSESSING SELECTED SUBJECT-AREA PROBLEMS AND SITUATIONS

(75) Inventors: Stephen Jay Datena, Portland, OR (US); Bart Eugene Lonchar, Portland, OR (US)

(73) Assignee: Lifecom, Inc., Portland, OR (US)

( * ) Notice: Subject to any disclaimer, the term of this patent is extended or adjusted under 35 U.S.C. 154(b) by 471 days.

(21) Appl. No.: 10/367,302

(22) Filed: Feb. 14, 2003

(65) Prior Publication Data

US 2003/0167246 A1 Sep. 4, 2003

Related U.S. Application Data

(60) Provisional application No. 60/358,947, filed on Feb. 22, 2002.

(51) Int. Cl.
*G06F 17/00* (2006.01)
*G06N 5/02* (2006.01)

(52) U.S. Cl. ............... 706/46; 706/50; 706/60

(58) Field of Classification Search ............ 706/46, 706/60, 50; 705/1
See application file for complete search history.

(56) References Cited

U.S. PATENT DOCUMENTS

| 5,822,743 | A | * | 10/1998 | Gupta et al. ............ 706/50 |
| 5,924,072 | A | * | 7/1999 | Havens ................. 705/1 |
| 5,940,817 | A | * | 8/1999 | Kishi et al. ............ 706/46 |
| 6,003,020 | A | | 12/1999 | Hazlehurst et al. |
| 6,182,067 | B1 | | 1/2001 | Presnell et al. |
| 2003/0063780 | A1 | * | 4/2003 | Gutta et al. ........... 382/118 |

OTHER PUBLICATIONS

Tony. T Lee, An Information-Theoretic Analysis of Relational Databases—PartII: Information Structures of Database Schemas, Oct. 1987, IEE Transactions on Software Engineering, vol. SE13, Iss. 10, p. 1062, 11 pgs.*

* cited by examiner

*Primary Examiner*—Joseph P Hirl
(74) *Attorney, Agent, or Firm*—Jon M. Dickinson, PC; Robert D. Varitz, PC

(57) ABSTRACT

A computer-based method and apparatus for assessing problems and situations in a defined knowledge domain, employing both (a) an inferential database of elemental data components, as domain-wide as possible, which are relevant to the domain, and (b) periodic statistical reviews of reported assessment results in relation to that database to establish the certainty levels of such results. The invention employs nonlinear assessment techniques likenable to human reasoning, and thereby, as well as in other ways, conducts assessment tasks in a manner that differentiates it from conventional, machine-based, linear problem resolution.

4 Claims, 8 Drawing Sheets

SIMPLE EDP = ONE AND ONLY ONE DATA COMPONENT

COMPLEX EDP = ONE OR MORE DATA COMPONENTS GROUPED IN THE CONTEXT OF A SINGLE PROBLEM TYPE.

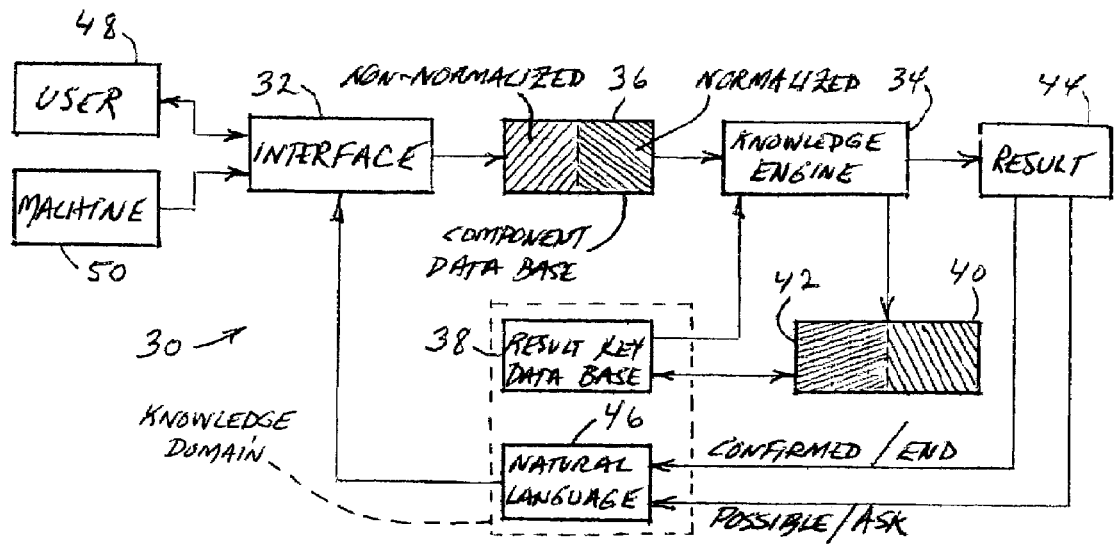
Fig. 1
SIMPLE EDP = ONE AND ONLY ONE DATA COMPONENT
COMPLEX EDP = ONE OR MORE DATA COMPONENTS GROUPED IN THE CONTEXT OF A SINGLE PROBLEM TYPE.
Fig. 2
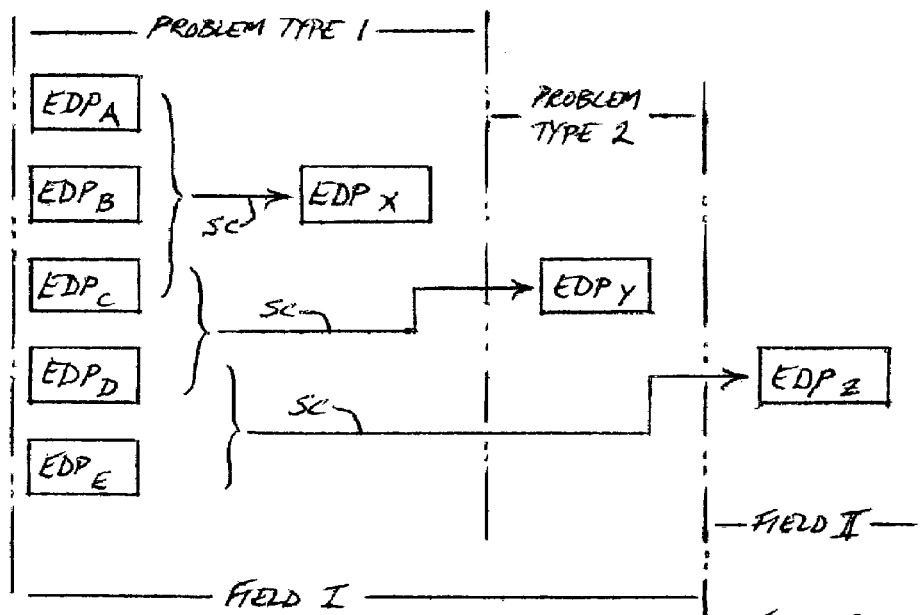
Fig. 3

COMPUTER-BASED INTELLIGENCE METHOD AND APPARATUS FOR ASSESSING SELECTED SUBJECT-AREA PROBLEMS AND SITUATIONS

CROSS-REFERENCE TO RELATED APPLICATION

This application claims priority to previously filed U.S. Provisional Patent Application Ser. No. 60/358,947, filed Feb. 22, 2002, for "Computer-Based Intelligence Method and Apparatus for Assessing Selected Subject-Area Problems and Situations". The entirety of that Provisional Application's disclosure, which is attached hereto as Appendix A, is hereby incorporated by reference.

BACKGROUND AND SUMMARY OF THE INVENTION

This application relates to a general purpose method and apparatus which employs a unique knowledge engine, and an associated unique library (and other) structure, to perform focused assessments and diagnoses of various problems and situations. In particular, it discloses such an invention which strongly mimics the natural human thought process, and which is endowed with a powerful interactive and adaptive capability to grow and "learn" in every subject area to which its "attention" is directed. It is usable in all subject areas, or domains, of knowledge.

For the purpose of illustration herein, a preferred embodiment of, and a manner of practicing, the invention are described herein principally in the context and knowledge domain of medical diagnosis.

The present invention marks a significant departure from conventional, so-called artificial intelligence systems and processes, and offers a notable opportunity to fulfill the long-standing desire to link the processing power of a computer to an algorithmic approach which truly patterns (problem-/and situation-assessment) performance closely to the ways in which the human mind actually processes such activity.

With this desire held in mind, conventional artificial intelligence machines and methods have two general limitations. First of all, they are usually based upon linear decision processes. Secondly, they tend to be designed around specific applications, and are especially so designed in such a manner that the particular application per se dictates the architecture of the associated system and methodology. They have a strong singular focus. Linear-decision models, the conventional landscape, involve embedded data, in the sense that the applicable data structure is part of the decision-making architecture itself. This condition limits the possible outcomes of assessment behavior, and requires a significant overhaul of a system and of its associated methodology every time that new data is incorporated therein. Such linear-decision architecture, which essentially is a rule-based architecture, limits flexibility because of the fact that a user must follow certain designed pathways, even if those pathways are not optimal for the particular problem at hand. Domain-specific applications suffer from similar problems, since the underlying architecture therein is restricted by domain-specific data sets.

The system and methodology of the present invention, as will be seen, overcome all of these limitations, and provide a functionally superior, non-rule-based, model of human-mimicking machine intelligence. For example, in accordance with implementation and practice of the present invention, data sets are totally modular. Changes can be made in the applicable knowledge repository without disrupting the fundamental, available assessment processes in any way. This condition allows the system and methodology of this invention easily and readily to expand its fund of knowledge without any of the limitations that have restricted the scalability of previous, expert, artificial intelligence systems.

Basically, rules or knowledge-based systems, artificial intelligence systems, use 'hard' Boolean logic architectures. Such systems have utility but are hampered by their linearity and rigid knowledge structures—i.e. they contain data embedded within a process structure. To incorporate new data into such a structure requires a substantial re-write of the corresponding process, or processes. This becomes a large data-maintenance problem as complexity of a knowledge domain increases. Another limitation is that designers of such systems must anticipate all possible relationships within the relevant data set in order to field a reliable system. This can also be a limitation of classic neural network architectures.

Classic fuzzy logic, or Bayesian nodal systems, invariably depend upon statistical analysis. Numerous data propagation and maintenance issues are associated with such systems. There are two main limitations for practical decision support application. One, statistical relationships are not static within subject (or subject areas of interest). And two, statistical relationships themselves break down at the level of the individual. Presentation of statistical information to decision makers may actually complicate decision making. Systems using statistical methods are by definition limited in applicability in early warning situations or where 'out of box' thinking (recognition of low probability issues) is required in order to recognize instances where rare situations, conditions or threats may in fact be present.

By way of further contrast with prior art artificial intelligence technology, and in terms of important offered advantages, the system and method of the present invention are not limited to operation in but a single knowledge domain. More specifically, the invented system and method can work universally in any knowledge discipline, can handle a large number of potential assessment results with great ease and stability, and can rapidly and seamlessly perform complex assessments involving thousands of data elements. It will not choke, even on massive, data-intensive issues. As will become apparent, the invention can readily be integrated for use with a wide variety of existing, knowledge-domain-associated relational databases, and within all operating environments, can perform with a remarkably "human ability" to alter the direction being taken during an assessment operation based upon newly encountered data. Additionally, the system and methodology of the present invention offer the further advantages that the system and method: (a) essentially use natural-language text structure to communicate with users, thus making extensive user training unnecessary; (b) can receive and process input data without any concern or requirement for defined-order input; (c) will consider all available data each time that there is a "run" of assessment behavior; (d) can link assessment activities to documented research relating to any selected knowledge domain; and (e) can properly process both vague, minimal assessments, as well as detailed assessments.

The invention is scaleable, and is capable of embracing the full weight of any subject area. Uniquely, it links, as assessment companions and "co-workers", the worlds of both inference and statistical analysis. It can undertake an assessment task with very modest and sketchy inquiry-input information delivered in any sequence or order. It can refine an assessment task by directing inquiries to, and soliciting related responses from, a user, and can create sophisticated and tightly focused output assessments in a easily understandable natural-language manner (as just mentioned above).

The functional building blocks of the method and apparatus of this invention take the form of elemental and fundamental, inferential components which are referred to herein as elemental data points (EDPs). Two types of such EDPs are employed. One is referred to as a simple EDP, and the other as a complex EDP. A simple EDP consists of a singular data component, such as the word "shoulder" in a medically focused embodiment of the invention. A complex EDP consists of the associated combination of a single problem type, such as the word "pain" (in the medical field), and at least one data component, such as the word "shoulder" just mentioned. As will be more fully explained shortly, FIG. 2 in the drawings, still to be described herein, verbally diagrams the anatomies of these two kinds of EDPs.

These EDPs are lowest-common-denominator-type elements that relate to, and represent, a wide spectrum of characteristics (ultimately all that can be identified) which are relevant to the possibilities, variations and permutations of matters involving particular, selected subject areas, or domains. Put another way, each EDP permits no further relevant subdivision that will, during an assessment process, enhance the capability for further problem and/or situation assessment differentiation. Methodology practiced in accordance with the invention is employed to generate and organize such EDPs, and also to produce another category of elements referred to herein as Result Keys.

A Result Key, according to the invention, is a collection of EDPs that represent a unique presentation of an assessment result that is known and documented, and which is assigned a particular degree of certainty. A Result Key is thus a combination of EDPs that define a reportable result with some reliable degree of certainty. Result Keys are effectively "organized" into identifiable Master Keys, where each Master Key is effectively a collection of all EDP's that are associated with a single result, and Result Keys are identifiable collections of these EDPs which point, with different degrees of certainty, to that same result.

Another important element of a defined knowledge domain is referred to herein as a "problem type" (mentioned briefly above). As was stated earlier, so-called complex EDPs are made up of one or more data components grouped in the context of a problem type. A problem type is a distinct category of information, organized hierarchically for classifying a problem for a knowledge domain in a manner that mimics the way experts in that knowledge domain think of problems and situations. Ideally, the universe of problem types will be inclusive of all known problems within a particular knowledge domain. Problem types offer a convenient and effective entry point for users of the system and methodology of this invention for describing the problems and situations that they are wishing to have assessed.

TABLE I below diagrams the relationships of EDPs, problem types, and data components:

TABLE I

|  | Problem Type | Data Component |
|---|---|---|
| Simple EDP | n/a | Patient Age Band: 30-49 |
| Complex EDP | Pain | Location: Shoulder |
|  |  | Onset: Sudden |
|  |  | Frequency: Constant |

Associated with each EDP, in accordance with the invention, are two usage indicators which indicate whether the EDP (a) can be directly employed as part of a Result Key, and/or (b) whether the EDP can be used as part of a reported assessment. TABLE II immediately below generally shows how such indicators can exist:

TABLE II

| Type | | | |
|---|---|---|---|
| Classifications where the associated data components must be provided in the context of a problem type. | Y | Y | This would be considered a "normal" complex component. |
| | Y | N | This situation would be used to preserve a normalized view of complex components in order for the components to support shortcuts. |
| | N | Y | This represents complex data components that can be added to an assessment for documentation only, but are not considered by the adaptive knowledge engine. |
| | N | N | This is not a valid combination. |
| Classifications where a data component is complete without being defined in the context of a problem type | Y | Y | This would be considered a "normal" simple component. |
| | Y | N | This would be used to preserve a normalized view of simple components in order for the components to support shortcuts. |
| | N | Y | This would be used for simple components that can be added to an assessment for documentation only, but are not considered by the adaptive knowledge engine. |
| | N | N | This is not a valid combination. |
| Classification that represent syndromes, which are single data components that represent a highly granular complex set of characteristics. | Y | Y | This is generally not a valid combination because these highly granular components are only accessible via the refinement process of the adaptive knowledge engine. |
| | Y | N | This is the typical scenario for syndromes and other special simple components. This allows keys to be built for them yet their inclusion in an assessment is done outside the initial data capture process, with processes such as refinement, default components, etc. |
| | N | Y | This is not a common scenario, but could be used to capture highly granular data for documentation purposes only, without being considered by the adaptive knowledge engine. |
| | N | N | This is not a valid combination. |

The creation and use of such EDPs and Result Keys enables a still further important feature of the invention which is that, during an assessment, the system and methodology of this invention can approach the task of arriving at a reportable result by noticing the absence of some quality or characteristic that relates (a) to the original input inquiry data, and/or (b) to responses which are received from a user during what is more fully described below as an assessment refinement process. For example, in the field of medicine, a field wherein the invention has been found to offer particular utility, and which is employed herein as a model to illustrate the invention, the absence of some particular characteristic of good health can indicate the impending emergence of some infirmity. As a consequence, the invention offers an impressive opportunity, in this field, to give very early warnings about the onsets of potential medical problems.

In another field, such as, for example, the field of materials processing, the method and apparatus of the invention might notice the absence of a stream of certain processing-related data, which absence might indicate the occurrence of a failed processing step.

Importantly, the inferential database employed according to the invention is independent of the algorithm(s) employed by the knowledge engine during an assessment. This independence strongly supports the open versatility with which the structure and methodology of the invention perform.

Three of many powerful aspects of the system and methodology of this invention are: (a) that inferential, elemental data components are constructed to possess the characteristics and qualities mentioned above; (b) that a practice referred to herein as relevance short-cutting (shortly to be described) fuels remarkable efficiency in the assessment processing which is performed by the knowledge engine that is part of the system; and (c) that the practice of such short-cutting enables "lateral" investigations which cut across and embrace plural problem types, and even plural problem types that reside in plural, analogous knowledge domains. This unique "lateral" capability especially models human cognitive thinking, and avoids the linear decision-making trap which confines the capabilities of conventional artificial intelligence systems and methods.

The process and practice of so-called short-cutting relates to how data components are handled according to the invention. A short-cut data component, also referred to herein as a normalized data component, is a single data component which is associated with one problem type, and which acts as a surrogate for relevant, plural, other data components (non-normalized data components) that are associated with the same problem type, and/or with another, or plural other, problem type(s). Assessment relevance is the principal context within which short-cuts are created. As will be seen, relevance short-cuts by creating and organizing related bodies of normalized and non-normalized data components, significantly enhance the performance of the structure and methodology of this invention.

A simple illustration given immediately herebelow will illustrate the concept of relevance short-cutting. This illustration is set in the context of an assessment wherein the user is entering information regarding the lateral orientation of a medical phenomenon/issue. EDP entry value choices include: Left Side; Right Side; Both Sides; One Side Only—a total of four EDP possibilities. Relevance short-cutting normalization of this nominally four-EDP population causes the "values" of "Left Side" and "Right Side" to be representable also as "One Side Only". Hence, the two values "Left Side" and "Right Side", which exists as definitive, plural individuals from a non-normalized point of view, are treated as the single, integrated value "One Side Only" from the normalized point of view. The importance of this multiple-to-singular short-cutting practice will be more fully discussed later herein.

A further important contribution of the present invention is that it employs statistical analysis, utilizing past system performances to enhance the confidence levels of results produced in subsequent (downstream) assessments. During assessment activity, the system and method of this invention implement refinement sub-processes which thoughtfully elicit additional guided input information to help close in on the best obtainable assessment result. Data obtained during assessment performances are collected and stored in a manner whereby the knowledge engine in the system can perform statistical analysis to grow and improve the quality and effectiveness of the resident, underlying, inferential database which fuels system behavior.

These and many other features and advantages that are offered by the present invention will become now more fully apparent as the detailed description which follows is read in conjunction with the accompanying drawings.

DESCRIPTION OF THE DRAWINGS

FIG. 1 is a block/schematic diagram of both the preferred system of, and the preferred manner of practicing, the present invention.

FIG. 2 presents, in text form, the structures of the two fundamental types of data-component building blocks (EDPs) employed in and by the invention.

FIG. 3 diagrams the significant and important practice of relevance short-cutting which is implemented by the invention.

FIG. 11 is a block/schematic diagram illustrating one modified form of a system, and of a related methodology, that implement the invention in the setting of plural knowledge domains.

DETAILED DESCRIPTION OF THE INVENTION

Figure 4:
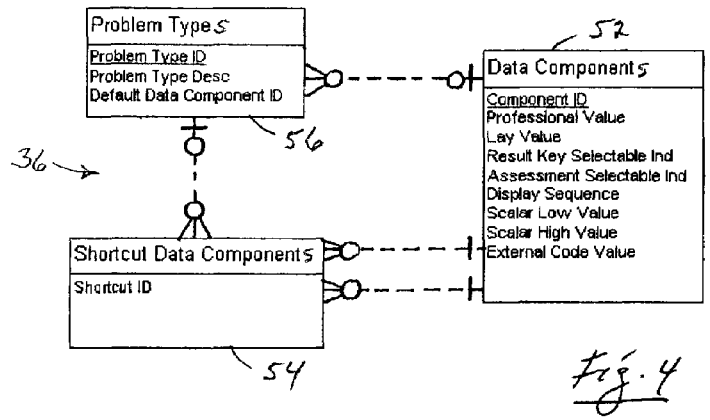
FIG. 4 illustrates, in text-enhanced, block/schematic, Bachman-diagram form, the important, adaptable data-component matrix (library) which contributes appreciably to the utility of the invention.

Turning now to the drawings, and referring first of all to FIG. 1, indicated generally at 30 is a computer-based knowledge system (and methodology) which is (are) constructed and organized in accordance with the present invention to perform assessments regarding problems and/or situations that relate to a particular defined field, or domain, of knowledge. As was mentioned earlier herein, system and methodology 30 will now be described in relation to the knowledge domain of medicine, though it should clearly be understood that the general structures of system and methodology 30, as illustrated in FIG. 1, are universal with respect to all selectable domains or fields of knowledge. Additionally, much of the invention description which now follows will be presented from a systemic rather than a methodological point of view. This systemic point of view will be understood to function as a fully enabling disclosure and description of the related, implemented methodology of the invention.

Included in system 30 are a communication interface 32, also called an input/output communication interface zone, a computer-based knowledge engine 34, also referred to herein as an output-assessment-striving knowledge engine, a data-component matrix (or library) 36, a Result-Key database (or library) 38, a statistical analysis region 40, an engine-run database (or library) 42, a result-assembling zone 44, and a natural-language output enabler 46. Interconnecting lines with arrowheads represent operative and communicative interconnections that exist, in accordance with the invention, between various ones of these several system and methodologic components.

At the left side of FIG. 1, two blocks, 48, 50 represent inputers of inquiry information that may be input the system in the context of requesting an assessment regarding a problem and/or situation in the field of medicine. Block 48 specifically represents a human inquirer, and block 50 a machine (computer) inquirer. During system operation, both of these blocks, or only one of these blocks if only one is employed or involved, feed(s) input information directly into interface 32, and receives system-assessment-result output information directly from this interface. Description will continue herein in the context of the human input (48) of information, etc. Interface 32 may take on any one of a number of conventional forms, such as a conventional web-based browser.

Knowledge engine 34 in system 30 takes the form of a conventional digital computer appropriately equipped with algorithms (a) for implementing assessments based upon the contents of component matrix 36 and of Result-Key database 38 in relation to input information supplied to interface 32, (b) for conducting statistical analysis through cooperative interaction between blocks 40, 42, and (c) for implementing, via block 46, natural-language, outwardly-directed communication through interface 32 with, for example, user 48.

Block 44 is organized to carry the responsibility, during assessment activity or at other times, and under the control of the knowledge engine, for determining whether a best-obtainable final result has been achieved, and if not, what sort or sorts of refinement questions ought to be directed through blocks 46, 32 to user 48. Such refinement behavior will be discussed more fully shortly.

The internal constructions of component matrix 36, and of Result-Key database 38, play key roles in enabling the human-cognitive behavioral capability of the system and methodology of this invention. These internal structures are detailed, respectively, in FIGS. 4 and 5 in the drawings, to which attention is now successively directed.

In FIG. 4, data-component matrix 36 is seen to be fully illustratable and describable with three, principal, interconnected blocks 52, 54, 56 which are labeled, respectively, "Data Components", "Short-Cut Data Components", and "Problem Types". FIG. 4 herein is presented in the format of a conventional Bachman-diagram which includes a collection of functional blocks, interconnected by lines that have different appearance characteristics, with certain well-known graphical symbols placed appropriately near the ends of these lines where the lines connect with the blocks.

These lines and symbols are well known by those skilled in the art, and a reading of FIG. 4, along with an understanding of the natures of the contents of blocks 52, 54, 56, will fully enable the creation and use, according to the invention, of data-component matrix 36 for any selected domain of knowledge. Text within blocks 52, 54, 56 describes the characteristics and attributes, generally, of the contents therewithin, and the following graphical and textual Table III, in a modest-content way, further illustrates component matrix 36.

TABLE III

Medical Diagnosis

Problem Types:

Pain
Rash
Mass or Lump
Data Classifications/data Components:

Onset
Sudden
Gradual
Pain Characteristic

Sharp
Dull
Colic
Burning
Color

Red
Tan
Black

Focusing attention now on FIG. 3 along with FIGS. 1 and 4 and TABLE III, the nature of a short-cut, as proposed by the present invention, is illustrated graphically and in text in FIG. 3. As was mentioned briefly earlier, short-cuts employ the characteristic of relevance to associate a plurality of broad-based EDPs, which are associated with one common problem type within one knowledge domain, typically with another singular EDP. This "other" EDP can be associated (a) either with the same common problem type in the same knowledge domain, (b) with another problem type in the same knowledge domain, and/or (c) with another problem type which is in another knowledge domain. This special "other problem type", and/or "other knowledge domain", quality of a short-cut is what allows for significant lateral-assessment processing in a manner which is very closely linked to normal human thinking. It is a key feature which distinguishes the structure and methodology of this invention from conventional "linear" artificial-intelligence structures and procedures. It is a feature which adds important flexibility, mobility, agility and efficiency to the performance and capability of the present invention.

Looking especially now to FIG. 1, one will observe that the "user side" of data-component matrix 36 "sees" the entire, large volume of non-normalized EDPs. This is important, inter alia, in allowing for a very high degree of unconstrained, free-form and free-flowing "dialog" between the system of this invention and a user. It prevents the significant conventional drawback, associated with known artificial intelligence systems, of early locking, channeling, and inflexible linearizing, of problem and situation assessments.

On the other hand, however, the "knowledge-engine side" of matrix 36 sees only the smaller, most relevant set of EDPs, as determined through the above-described process of short-cutting. Engine operating efficiency benefits significantly from this situation.

Figure 5:
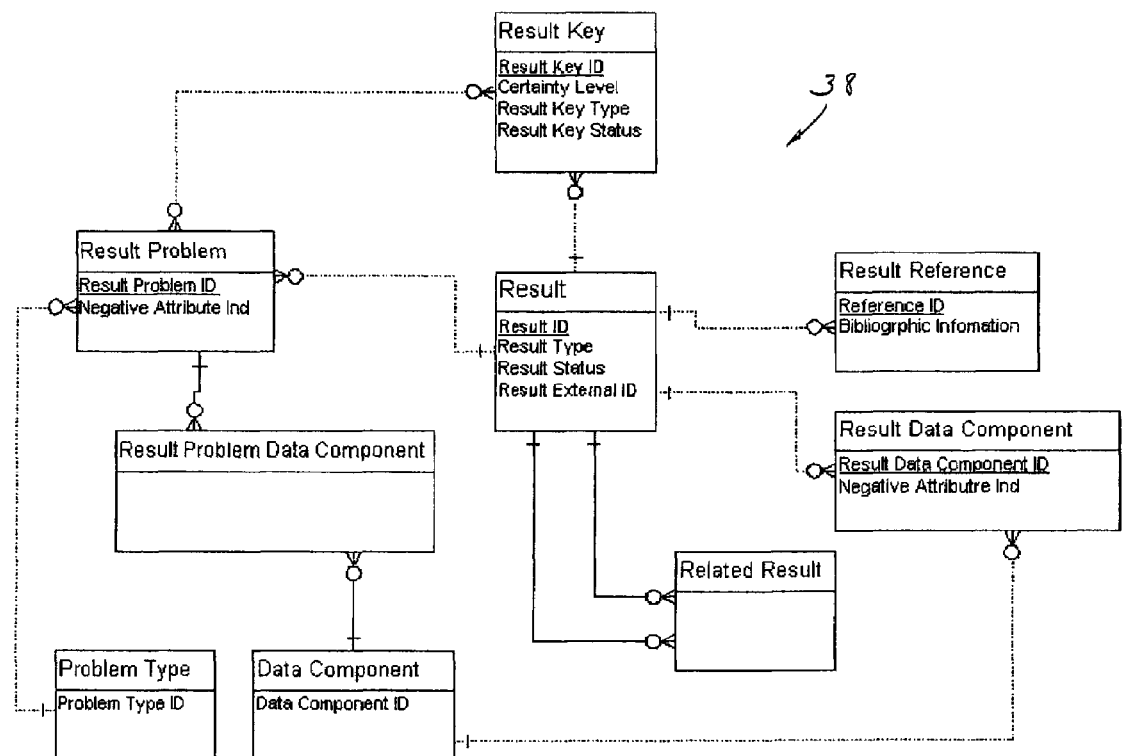
FIG. 5 illustrates, also in text-enhanced, block/schematic, Bachman-diagram form, the likewise important, adaptable Result-Key database (library) which co-functions with the component matrix in promoting the utility of the present invention.
Figure 6:
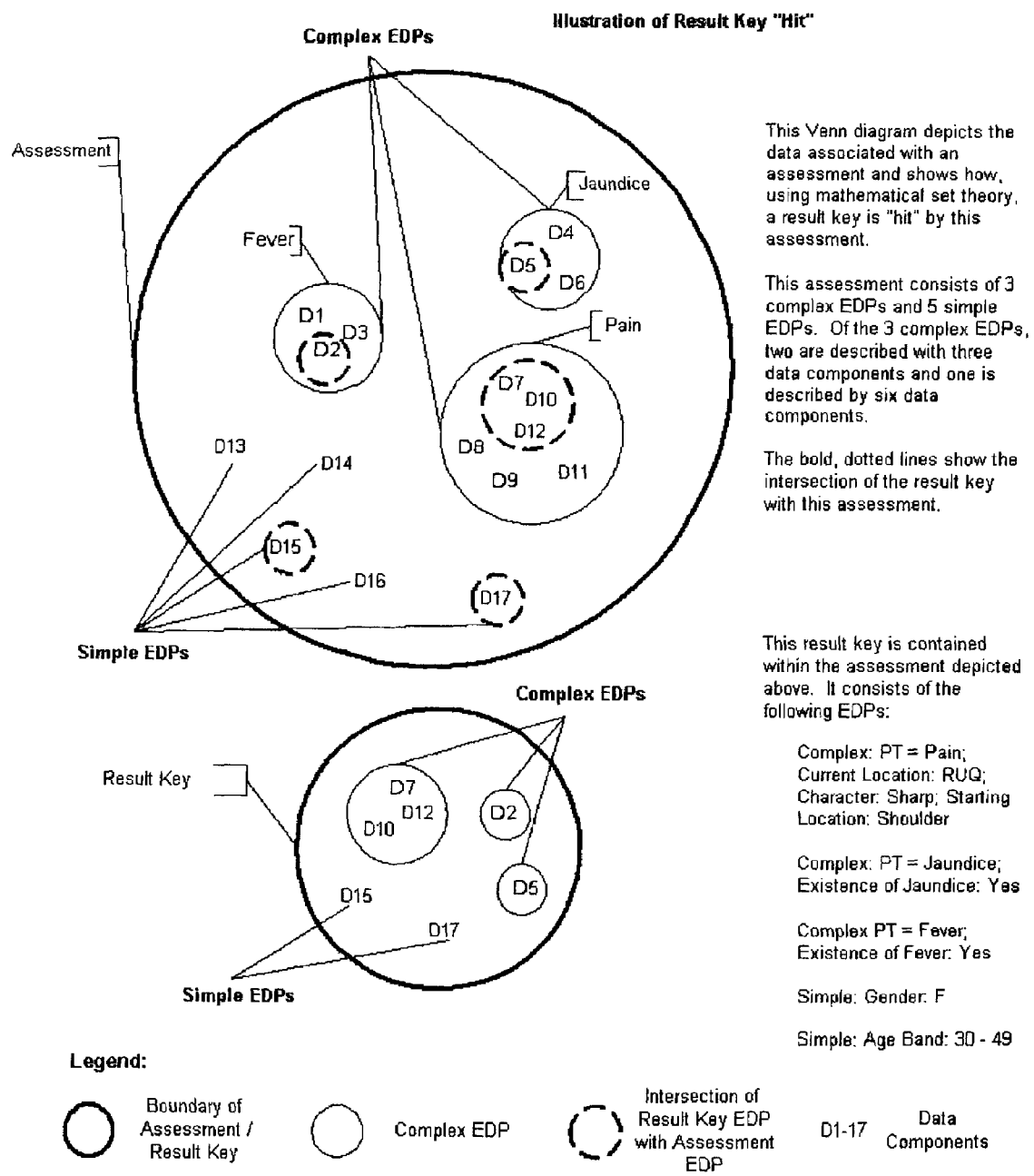
FIGS. 6-9, inclusive, are Venn diagrams elaborating different, specific, illustrative assessment closures toward an assessment result as performed by the system and method of this invention.
Figure 7:
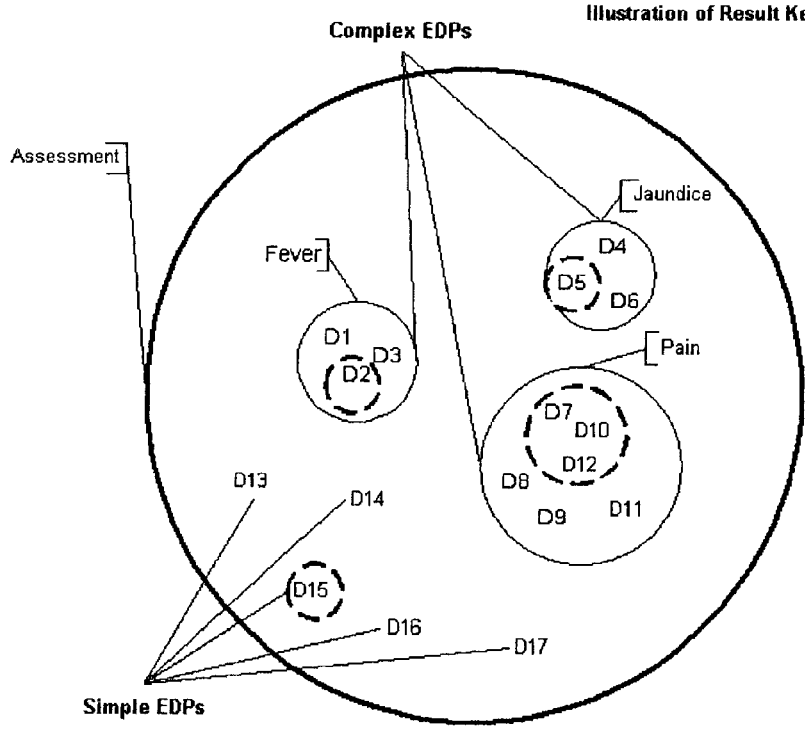
Figure 8:
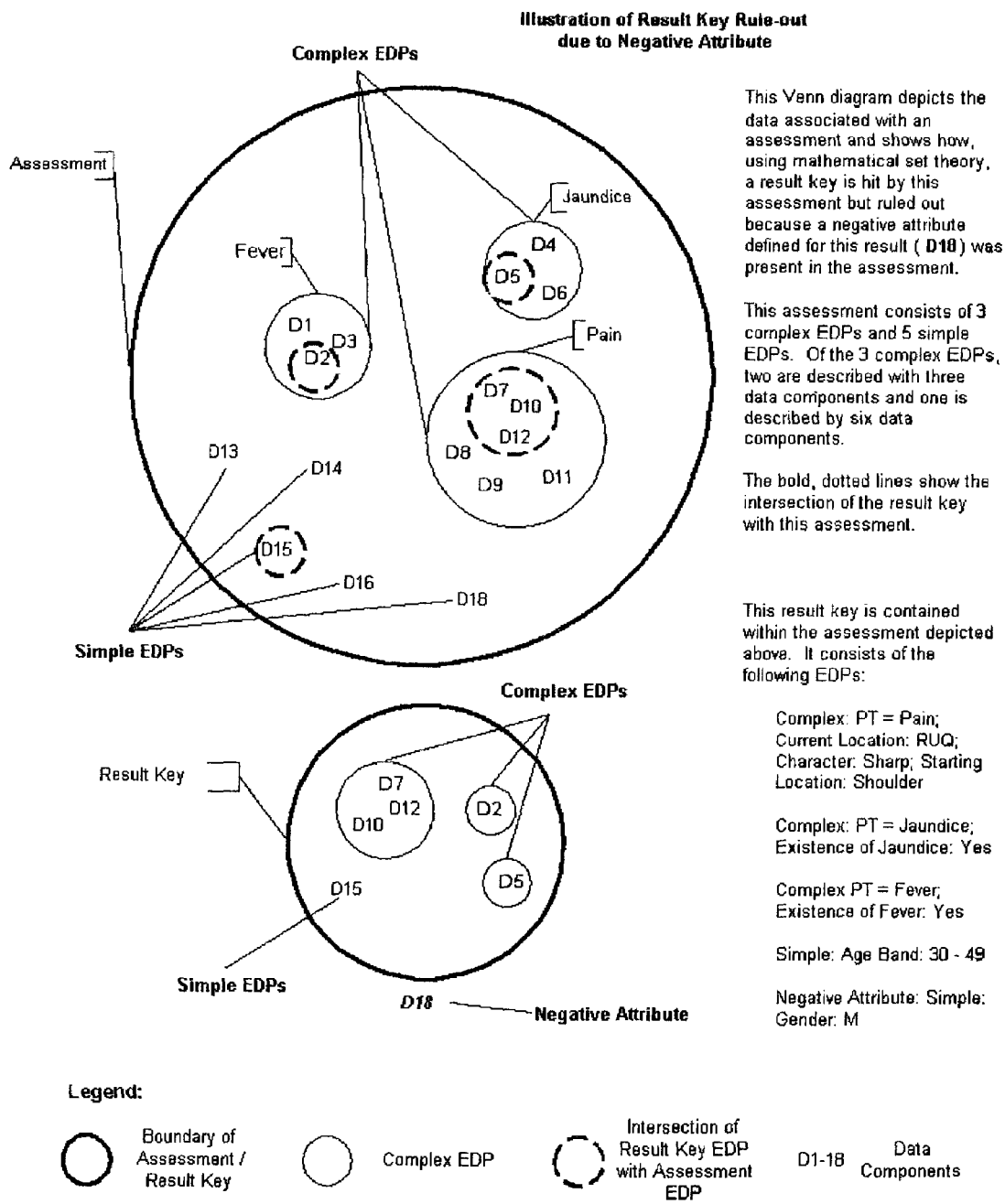
Figure 9:
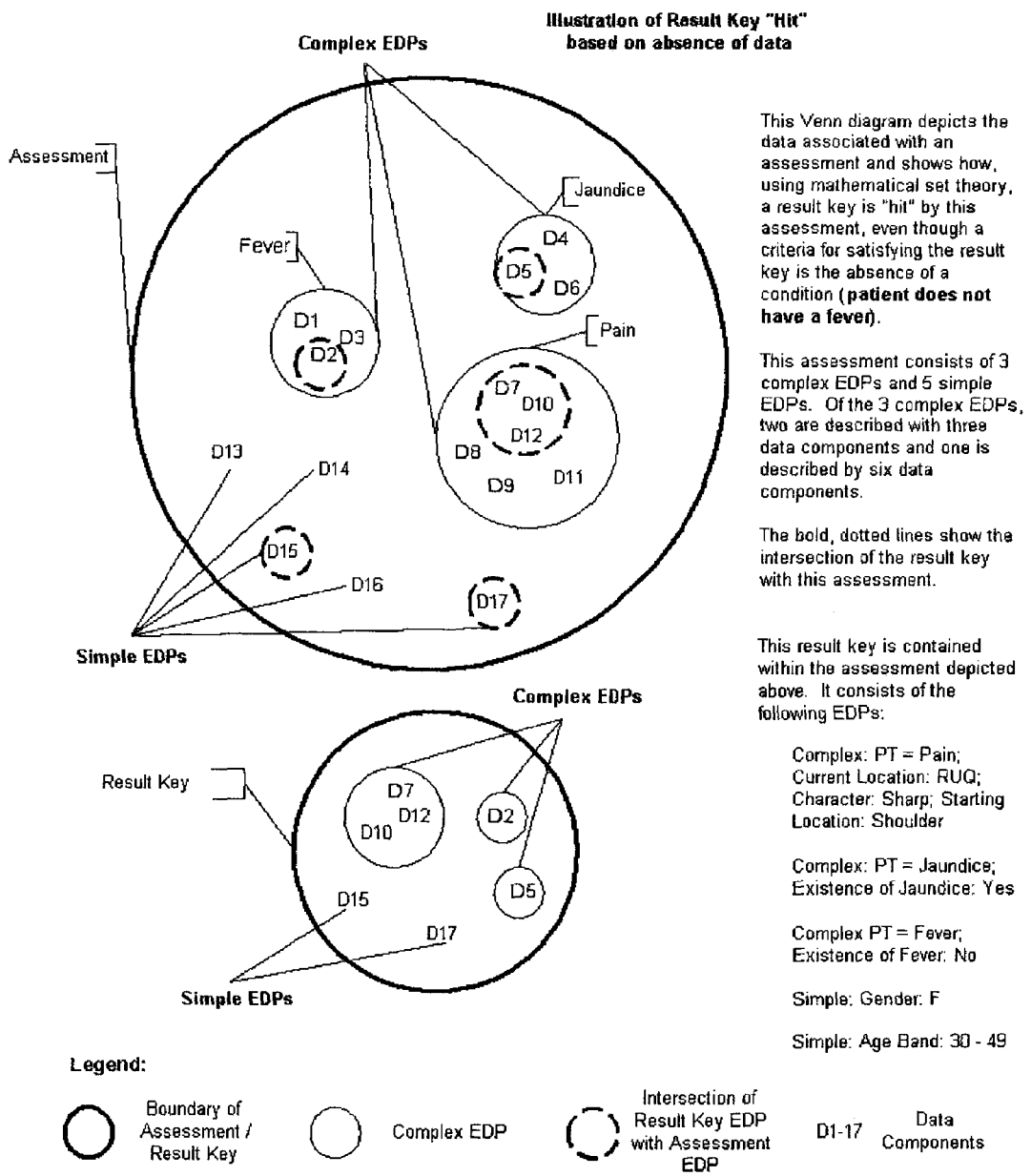

Shifting attention now to FIGS. 1 and 5 together, FIG. 5 details, as was mentioned earlier, the structure of Result-Key database 38. As is the case for previously described FIG. 4, FIG. 5 is, in its general layout, a conventional Bachman-diagram. This Bachman-diagram, along with the text material provided in it, fully describes to those skilled in the art the make-up and functionality of database 38. Accordingly, no further special elaboration of this database is deemed necessary.

As was noted earlier, still another important and significant offering of the present invention is its unique cooperative utilization of the "worlds" of both inference and statistics. This world is brought together in the special interactive behavior which takes place between knowledge engine 34, Result-Key database 38, and blocks 40, 42.

Each time that engine 34 runs an assessment process (still to be described), its performance results, including the EDPs and the result-keys employed, are recorded and stored in block 42, the "engine-run" database. It is with regard to this performance-recorded, engine-run data that statistical analysis is conducted.

At any appropriate interval, such as at the completion of each assessment "performance", or after a certain number of completed assessments, or completely at user selection and invocation, for several examples, engine 34, database 42, and statistical analysis region 40 cooperate to review stored performance data, and to analyze it to determine if any of several different kinds of result-key modifications are in order. Statistical analysis region 40 may conveniently take the form of appropriate statistical-analysis software which is resident in knowledge engine 34, and which may be designed in a conventional manner to review stored assessment-performance data. For example, such data may be reviewed, based upon previously determined assessment results, to assess whether a particular Result Key's EDP content should be changed (enlarged, reduced, etc.), whether that Result Key's level of certainty as to its correctness should be changed, whether the Result-Key should be eliminated, and so on. Such changes are "reported" to Result-Key database 38, and thus may change the content of this database if such is an appropriate event. System 30 conveniently, and perhaps preferably, asks "permission" to invoke any such Result-Key database revision. In this manner, the system and methodology of this invention continually self-improve to become more agile, effective and quickly accurate, much in the same way, at least in part, that the human mind adapts and grows from experience.

By utilizing statistical analysis in this helpful manner, the system and methodology of the invention uniquely integrate the management advantages of such analysis with the power and versatility of the inferential databases (EDPs) which form the data-component database and the Result-Key database. Coupled with the innovation of relevance short-cutting, the invention clearly cleverly mimics significant aspects of normal human cognitive thinking.

The influential underpinning of these two databases offers an approach landscape to problem and situation evaluation and assessment which is wide, rich, and common to normal avenues of reflective thinking. Short-cutting which can include relevance pointers to EDPs in the same or different problem areas, and to EDPs in the same or different knowledge domains or fields, prevents the constricting kind of linearization which characterizes conventional, machine, artificial-intelligence mannerisms. Such short-cutting also presents, or tends to present, to the knowledge engine for processing the most relevant and smallest-size set possible of foundation inferential data. With these databases clearly disconnected committedly from the underpinning processing algorithm(s), extensive flexibility and problem and situation evaluation are definitively offered and made present by the practice and implementation of the methodology and system of this invention. Reportable assessment results, based upon inferentially founded result-keys which are assemblages of different EDPs, reviewable and modifiable under the thoughtful and watchful eyes of statistical analysis, grow progressively more accurate and sure with time.

Completing now a description of what is shown in FIG. 1, attention is directed here to blocks 34, 44 and 46 therein.

Block 34, the knowledge engine, takes the form of a programmable digital computer, as was mentioned earlier, which is, inter alia, programmed to perform assessments, to report assessment results, and, as mentioned just above herein, to aid in the statistical analysis of recorded performance data. It is also suitably programmed to perform focusing refinements regarding the inputting of data by, for example, a human user 48. And so, for example, if no confirmed, reportable assessment result occurs during one run of assessment behavior, the knowledge engine utilizes block 44 to direct a set of specific, multiple-choice questions (see the line marked "POSSIBLE/ASK" in FIG. 1) to the user, requesting, effectively, additional input information. These questions which are directed to the user via natural-language block 46, are specifically related to the status of assessment processing which has so far been undertaken. This is the important refinement process mentioned earlier. Block 46 assures that these questions are presented to a user in intuitive natural language.

During the performance of an assessment, and in relation to EDP data which is provided by a user, knowledge engine 34 operates in accordance with the following "algorithmic instructions":

The Algorithm

An assessment ($A_x$) consists of one to many EDPs, and can be thought of as a set:

$A_x = \{EDP_1, EDP_2, \ldots EDP_n\}$

Each result key (in this case, $RK_x$) consists of one to many EDPs, and can also be thought of as a set:

$RK_x = \{EDP_1, EDP_2, \ldots EDP_n\}$

The adaptive knowledge engine returns a result (a positive ruling-in) when the following formula is true:

$A_x$ INTERSECT $RK_x = RK_x$

Simply stated, if the set of EDPs that comprise a Result Key are found within the EDPs that comprise the assessment, then the result corresponding to the Result Key would be returned. It is important to note that the EDPs do not have to be identical to satisfy a Result Key hit. The critical factor is that each EDP that is part of a Result Key must either equal an EDP in the assessment or be contained within an EDP in the assessment (a subset).

The intersection of a Result Key's EDP with an assessment's EDP must occur within a single EDP: It cannot span EDPs.

The result is considered negative (contraindicated—a positive ruling-out) if the following is true, when $MKN_x$ represents the set of EDPs comprising the master for result "x" that are contraindicated:

$A_x$ INTERSECT $MKN_x = 0$ (Empty set).

Continuing now with what is further shown in the drawings, the four diagrams which make up FIGS. 6-9, inclusive, are, as has already been mentioned, conventional Venn diagrams. To those generally skilled in the art, they are very self-explanatory regarding how the knowledge engine performs the above-described algorithm. In particular, those who are skilled in the art will readily understand clearly from these illustrative performance diagrams just how knowledge engine 34 performs an assessment during its operation, under several, different, typically encounterable assessment situations.

By way of brief summary, the four examples that are set forth in these four figures are based on a series of related medical diagnostic assessments which involve, for illustration purposes, three complex EDPs and five simple EDPs. In the first example (FIG. 6), a Result Key is depicted which gets a "hit" on this assessment. The Result Key consists of EDPs that represent the following scenario:

A female patient, age 30-49, inclusive, is experiencing sharp pain in the right upper quadrant that originated in the shoulder. This same patient is also experiencing fever and jaundice.

The result key is "hit" in this example because all of its EDPs are each completely contained within a single EDP in the overall assessment.

The second example (FIG. 7) illustrates a situation where a Result Key is not hit.

The third example (FIG. 8) pictures a case where a result is ruled out due to the existence of a negative attribute which has been presented and detected.

The last example (FIG. 9) illustrates a "hit" on a Result Key under circumstances where one EDP in that Result Key represents the absence of a particular condition.

The process of assessment refinement mentioned above is now described. In this description, which includes Table IV, the letters AKE are employed to refer to knowledge engine 34.

The refinement process of the adaptive knowledge engine can be engaged during assessments to lead the user to the final results by performing and analysis of the data already captured by the assessment and the possible results based on that data.

The refinement process generates a series of candidate standardized data lists that are organized and presented to the user. The user can add or subtract any data points to/from the assessment, and can resubmit the assessment to the engine.

The candidate data lists generated by the adaptive knowledge engine consist of data points that perform one of two functions:

1. Help confirm a possible result that the engine has identified.
2. Rule out a possible result based by identifying data that is contraindicated.

A run of the AKE will yield the following:

1. Zero to many specific results.
2. Zero to many general category results.
3. One or more potential results organized in what is called a "result map".

For each result known to the engine, there are three ways that refinement data can be generated for those results by the engine. These are:

1. Data points that would result in the satisfaction of a general category key for the result.
2. Data points that would result in the satisfaction of a high probability key or confirmed existence key for the result.
3. Data points that would contraindicate the result.

In addition, each result known to the AKE may have one or more "related results" that are results that share data points with the subject result and can be mistaken for the subject result.

By identifying the combinations of the types of results yielded by a run of the knowledge engine with the types of data points used for refinement, one can discover the distinct refinement algorithms that are used to produce refinement questions for an assessment. These combinations and resulting algorithms are depicted in the following Table IV.

TABLE IV

| Output of AKE→ Data Points | Specific Results | General Category Results | Potential Results |
|---|---|---|---|
| Ones that satisfy a general category key | Refinement Algorithm 1: Identify all EDPs for all related results (to a specific result that was returned by the engine) that participate in a general category key. | Refinement Algorithm 2: Identify all EDPs for all related results (to a general category result that was returned by the engine) that participate in a general category key. | Refinement Algorithm 3: Identify all EDPs for all potential results that participate in a general category key for that result. |
| Ones that satisfy a high probability key | Refinement Algorithm 4: Identify all EDPs for all related results (to a specific result that was returned by the engine) that participate in a high probability key. | Refinement Algorithm 5: Identify all EDPs for all related results (to a general category result that was returned by the engine) that participate in a high probability key. | Refinement Algorithm 6: Identify all EDPs for all potential results that participate in a high probability key for that result. |
| Ones that contraindicate the result. | Refinement Algorithm 7: Identify all EDPs for all related results (to a specific result that was returned by the engine) that are contraindicated. Refinement Algorithm 10: Identify all EDP for each specific result returned that would contraindicate that result. | Refinement Algorithm 8: Identify all EDPs for all related results (to a general category result that was returned by the engine) that are contraindicated. | Refinement Algorithm 9: Identify all EDPs for all potential results that contraindicate those results. |

If, due to insufficient data capture, the engine does not generate results, refinement cannot be invoked.

The results of refinement are organized by problem type for logical consideration.

When refinement is invoked, any or all of the refinement algorithms may be invoked. Which algorithms are invoked is a function of (1) the number and type of results generated for the assessment at the point refinement is invoked, and (2) how the AKE is configured for the subject area. Some types of refinement may not apply to some subject areas.

Figure 10:
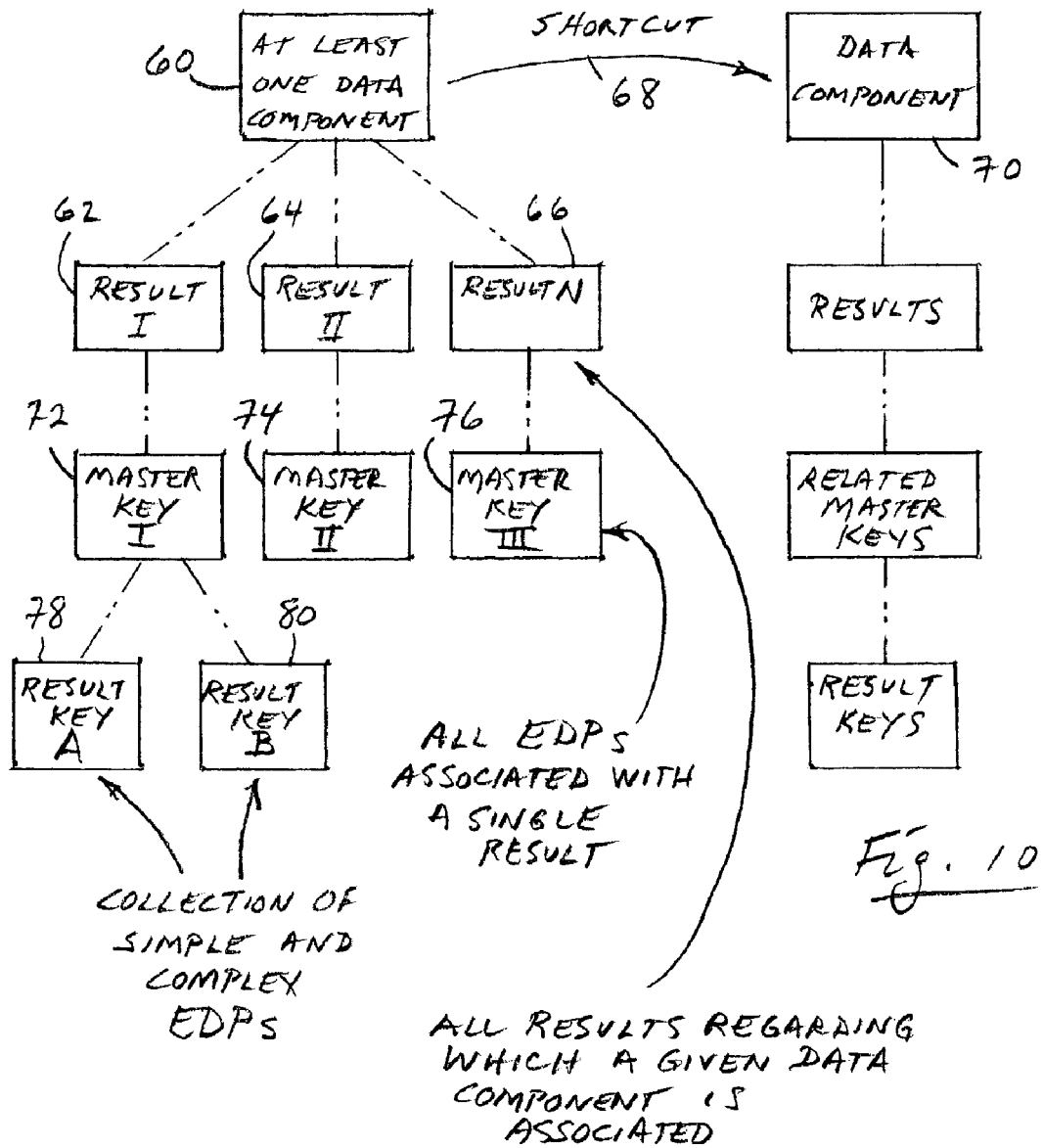
FIG. 10 is a block/schematic diagram illustrating performance of the invention from the point of view of entry of a single data component, and the operative relationships between this entry and the subject matters of Results, Result Keys, Master Keys and Shortcutting.
Figure 4:
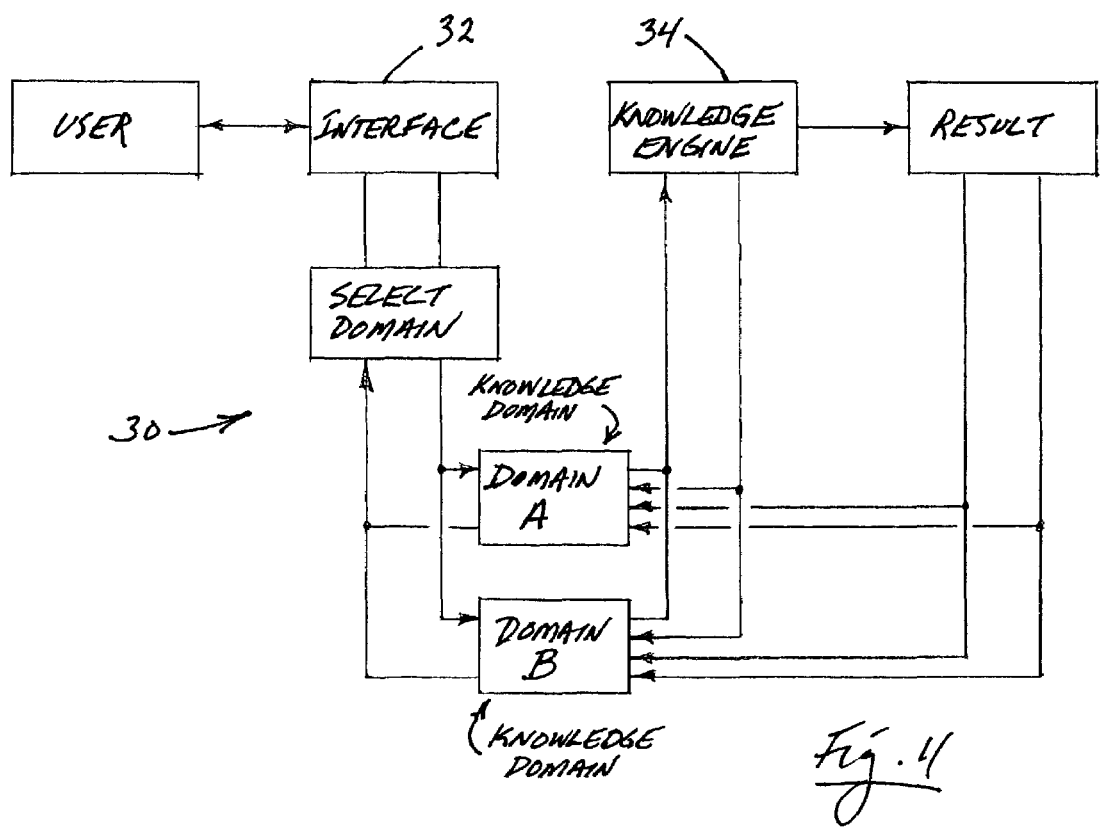

Reviewing now the overall methodology of the present invention in light of the systemic description which has largely occupied the text above, while different designers of a system and a methodology made in accordance with this invention might, and may, chose different starting approaches to making an assessment, one suitable approach in the context of a single-problem-domain system, involves asking a user, as an opening question, for example, to identify the (or a) specific problem type which is associated with the problem and/or situation that has prompted the user to invoke system assessment in the first place. FIG. 10 generally illustrates what occurs when a response to such an opening question takes the form of one of the simplest possible replies, such as a single data-component reply, like "existence of pain", without more.

After receipt of the "existence of pain" input response (Block 60 in FIG. 10) which response takes the form of a single EDP, the computing structure of the invention makes an appropriate survey of the database content to identify all results "known" to the system to which the data component "existence of pain" relates (Blocks 62, 64, 66 in FIG. 10). The system thus responds to this single-data-component response with an expansive "look" at the entire database of results. The system simultaneously responds (Line 68 in FIG. 10) to any relevant shortcutting which is associated with the "existence of pain" response, and if shortcutting exists, identifies one or more other data components (A) (Block 70 in FIG. 10) with respect to which it performs the same kind of expansive look (or looks) at its results database as was just described for the single input data component.

What next occurs, with respect to all results that have been identified by the process outlined above, is that the Master Key for each such result (Blocks 72, 74, 76) is examined with regard to its content which includes all EDPs that are associated with the particular result, organized, effectively, into different Result Keys (see Blocks 78, 80 that are associated with the Master Key represented by Block 72). Each such Result Key is a collection of EDPs which has been determined to point, with a particular degree of certainty, to the associated result.

When a Result Key is "hit" (see FIGS. 6 and 9) an assessment report, along with any determined requests for refinement, are reported through block 32 (see FIG. 1) to the user.

From the above-given description of the present invention, considered along with the drawings, the system database can be seen to be organized, by relevance short-cutting, and at least in part, into bodies of (a) normalized and (b) non-normalized data components. Such non-normalized data components are effectively further organized into different problem-specific groups of data components, all data-component contents of which are linked by relevance short-cutting to a common, normalized data component (see especially FIGS. 3 and 10 which directly illustrate this important organizational feature of the invention, and from which the just-stated text is directly readable). It is this important short-cutting feature of the invention which, as expressed earlier herein, fuels the unique assessment-processing efficiency of the system by establishing normalized data components through which assessment linkages may be made to a plurality of possible, different problem types within a given knowledge domain, such as the domain of medical diagnosis, regardless of the specific problem-type "nature" of a user-entered data.

The apparatus and method of the invention are thus now fully described and illustrated. The invention's powerful ability to provide problem and/or situation assessment in any selected knowledge field should be evident. And, while a preferred and best mode embodiment and manner of practicing the invention have been expressly set forth herein, it is appreciated that variations and modifications are certainly possible, and will be recognizable by those skilled in the art, and all of these variation and modifications are deemed to be part of this invention.

We claim:

1. A method utilizing the processing activity of a computer which is present in a computer-based knowledge system for outputting problem diagnoses in a defined, plural-problem-type knowledge domain based upon user-introduced data including EDP and problem-type content, and where the system possesses a defined-knowledge-domain database which contains bodies of both normalized and non-normalized, problem-type-associated EDPs that are (1) linked by relevance short-cutting, and (2) organized into different, problem-type-associated Result Keys, said method comprising the computer-implemented steps of reviewing such user-introduced EDP and problem-type data content to identify all system-known results, including plural, different problem-type results, which contain the user-introduced EDP data content, with respect to all such known results so identified, examining the respective, associated Master Keys, where each Master Key is a collection of all EDPs that are associated with a single result, these EDPs being organized into one or more Result Key(s) which, where plural Result Keys are involved, point with different degrees of certainty to the same result which is associated with the Master Key, for each such associated and examined Master Key, looking therein for an associated Result Key hit, and following said looking step, and on the occurrence of, and in relation to, such a Result Key hit, outputting, for use by the system user, a problem diagnosis associated with the user-input EDP and problem-type data content.

2. The method of claim 1, wherein, within the body of non-normalized EDPs, there are different groups of non-normalized EDPs whose respective group members are collectively linked by relevance short-cutting to a common, normalized EDP, but are associated, in a group-specific manner, to different, respective problems and/or situations.

3. A plural-problem-type, plural-defined knowledge-domain method, utilizing a computer-based knowledge system possessing (a) a computer knowledge engine, and (b), for each defined-knowledge-domain, a related, defined-knowledge-domain, engine-accessible, database which contains both normalized and non-normalized, problem-type-associated EDPs that are (1) linked by relevance short-cutting, and (2), organized into different, problem-type-associated Result Keys which point with different degrees of certainty to different outputtable problem diagnosis results, for outputting domain problem diagnoses based upon user-system-introduced EDP problem-type data which is relevant to any one of the mentioned, plural knowledge domains, said method comprising in relation to such user-introduced data, and in a plural-problem-type manner, and further in a manner which is unconstrained either by the particular problem-type, or problem-types, or the knowledge domain, which is(are) directly associated with the user-introduced data,
  (a) invoking cooperative interaction between the engine and the database, via the use of relevance short-cutting, to explore the relationship(s) of the user-introduced data to the EDP data contained within all of the normalized and non-normalized EDP databases, thus to locate a result-pointing Result Key having the highest degree of certainty in terms of pointing to a result based on the content of the user-introduced data, and
  (b) output-reporting as a problem diagnosis that result to which the located Result Key points.

4. The method of claim 3, wherein each of the defined-knowledge-domain databases is structured to contain plural EDPs organized via relevance short-cutting into bodies of (a) normalized and (b) non-normalized EDPs, and wherein, within the body of non-normalized EDPs, there are different groups of non-normalized EDPs whose respective group members are collectively linked by relevance short-cutting to a common, normalized EDP, but are associated, in a group-specific manner, to different, respective problems and/or situations.

* * * * *

UNITED STATES PATENT AND TRADEMARK OFFICE
CERTIFICATE OF CORRECTION

| | |
|---|---|
| PATENT NO. | : 7,389,280 B2 |
| APPLICATION NO. | : 10/367302 |
| DATED | : June 17, 2008 |
| INVENTOR(S) | : Stephen Jay Datena et al. |

It is certified that error appears in the above-identified patent and that said Letters Patent is hereby corrected as shown below:

Column 10, line 60, the formula should read   -- $A_x$ INTERSECT $MKN_x = 0$ (Empty set). --

Signed and Sealed this
Twenty-eighth Day of December, 2010

David J. Kappos
*Director of the United States Patent and Trademark Office*